April 16, 1963 — M. H. GROVE — 3,085,782
GATE VALVE CONSTRUCTION
Filed Jan. 29, 1960 — 4 Sheets-Sheet 1
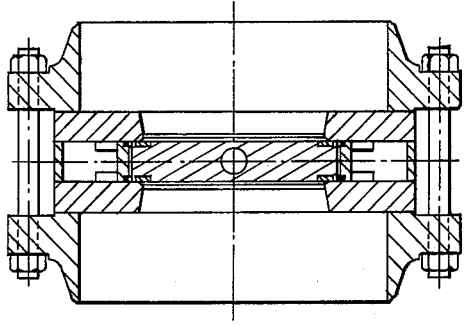
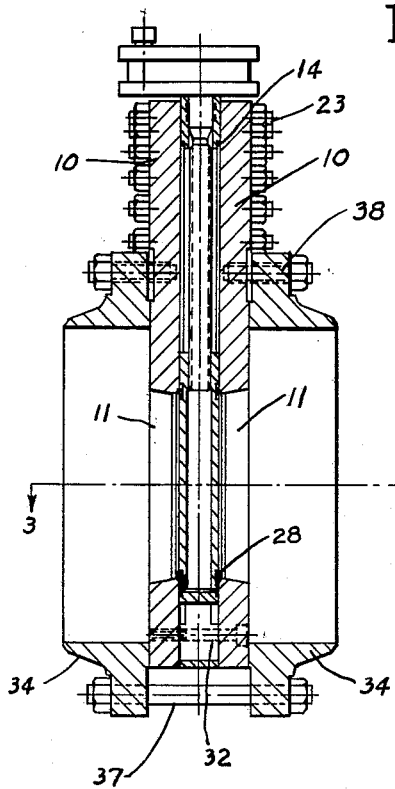
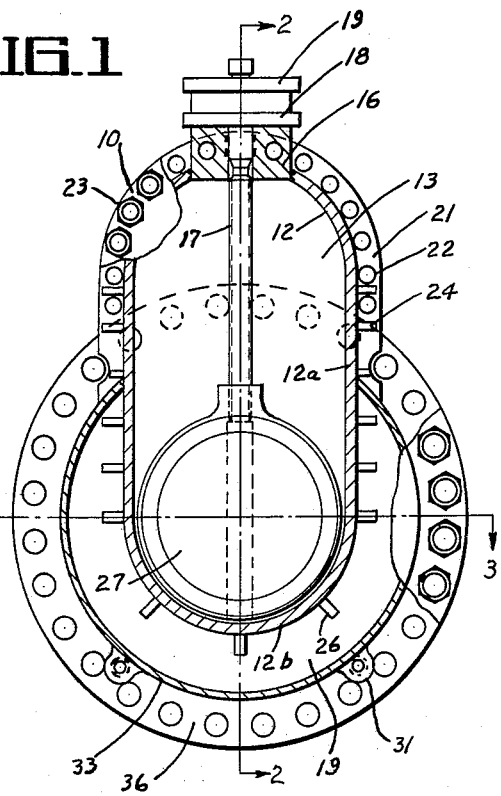
INVENTOR.
BY M. H. Grove April 16, 1963  M. H. GROVE  3,085,782
GATE VALVE CONSTRUCTION
Filed Jan. 29, 1960  4 Sheets-Sheet 2
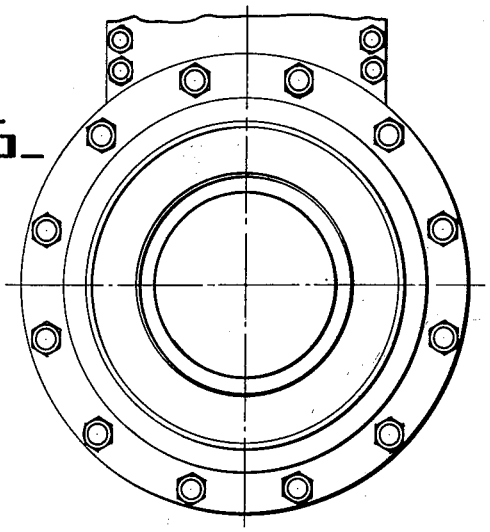
FIG_5_
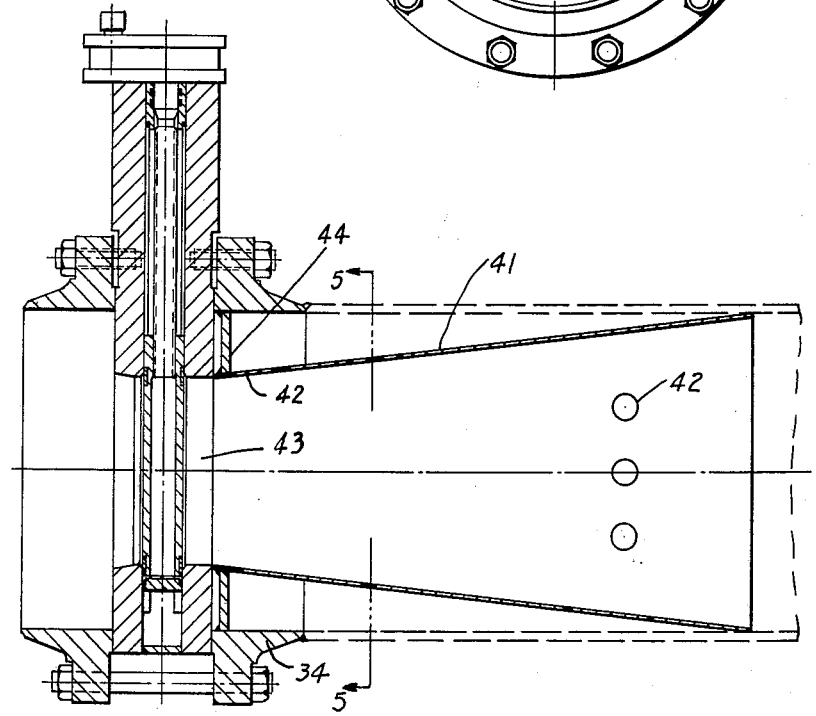
FIG_4_
INVENTOR.
BY M.H.Grove April 16, 1963  M. H. GROVE  3,085,782
GATE VALVE CONSTRUCTION
Filed Jan. 29, 1960  4 Sheets-Sheet 3
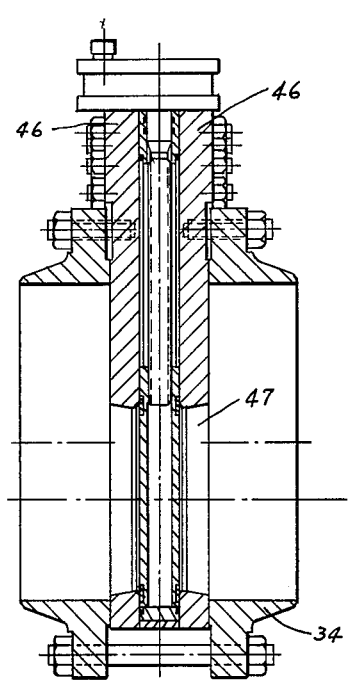
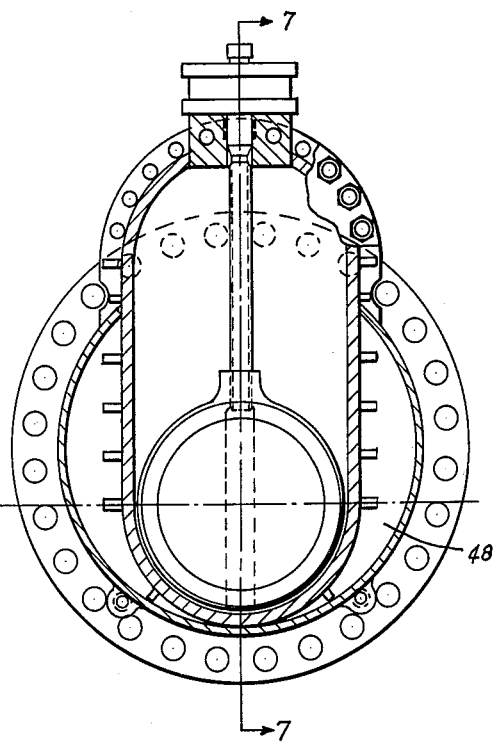
INVENTOR.
BY M. H. Grove

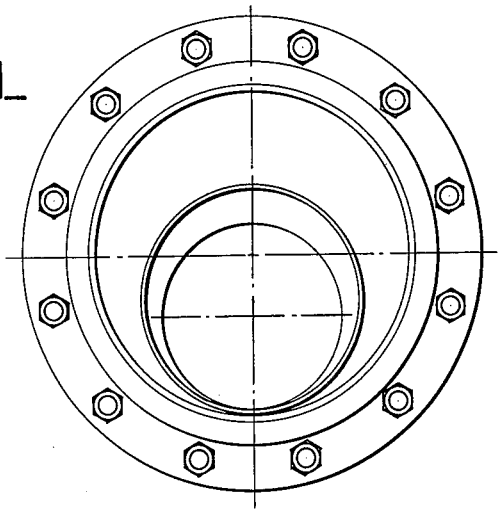
FIG_9_
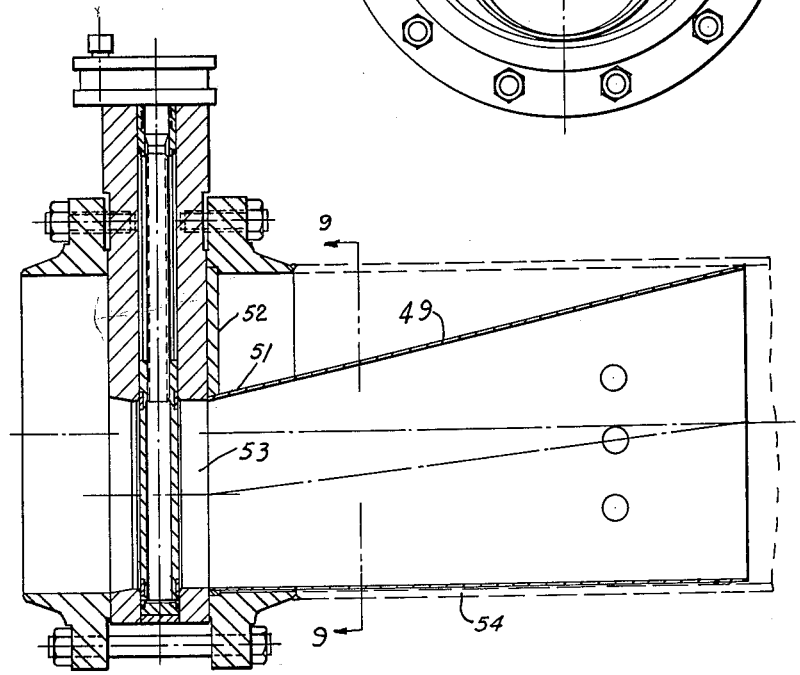
FIG_8_
INVENTOR.
BY M.H. Grove

United States Patent Office 3,085,782
Patented Apr. 16, 1963

3,085,782
GATE VALVE CONSTRUCTION
Marvin H. Grove, 340 Hillside Ave., Piedmont, Calif.
Filed Jan. 29, 1960, Ser. No. 5,421
4 Claims. (Cl. 251—124)

This invention relates generally to valves of the gate type for controlling flow of various fluids, including liquids and gases.

When applying valves to pipelines and other gas or liquid systems, it is frequently desirable to employ a valve opening that is somewhat smaller than the internal diameter of the associated piping. This has led to the use of so-called Venturi valves, which employ Venturi shaped passages for conserving flow energy. Conventional Venturi valves of the gate type require special valve bodies having body hubs provided with tapered passages. Such hubs add considerably to the weight and cost of the valves. In some instances, standard valve bodies provided with plain hubs are connected into pipelines by the use of so-called transition sections, which are tapered. Here the cost of installation is relatively high, due to the cost of the transition sections, and of the welding operations required for installation. Particularly in connection with the installation of valves of the plug type, standard bodies have been used with plain hubs, together with a tapered throat section which is inserted into the adjacent downstream portion of the pipe, and which at its smaller end couples with the valve body. The construction of such recovery tube inserts has been complicated by the necessity of varying the cross section configuration to merge a rectangular configuration of the body passage, with the circular configuration of the piping. In addition, the constructions employed have lacked flexibility in that they have not been readily adaptable to varying conditions.

In general it is an object of the present invention to provide a gate valve construction which greatly facilitates the use of a valve opening substantially smaller in diameter than the diameter of the piping with which it is to be used.

Another object of the invention is to provide an improved gate valve of the Venturi type which has wide flexibility with respect to industrial applications.

Another object of the invention is to provide a gate valve construction which readily lends itself for use with recovery tube inserts, and which greatly simplifies installation of such Venturi valves under field conditions.

Another object of the invention is to provide a Venturi valve construction which can be economically manufactured.

Additional objects and features of the invention will appear from the following description in which the preferred embodiments have been set forth in general in conjunction with the accompanying drawing:

FIGURE 1 is an elevational view, partly in section showing a valve in acordance with the present invention.

FIGURE 2 is a cross sectional view taken along the line 2—2 of FIGURE 1.

FIGURE 3 is a cross sectional view taken along the line 3—3 of FIGURE 2.

FIGURE 4 is a side elevational view in section illustrating another embodiment of the invention using a recovery tube.

FIGURE 5 is a cross sectional view taken along the line 5—5 of FIGURE 4.

FIGURE 6 is a view like FIGURE 1 but showing another embodiment in which the valve opening is offset with respect to the associated pipe hubs.

FIGURE 7 is a cross sectional view taken along the line 7—7 of FIGURE 6.

FIGURE 8 is a side elevational view in section illustrating the embodiment of FIGURES 6 and 7 together with a recovery tube.

FIGURE 9 is a cross sectional view taken along the line 9—9 of FIGURE 8.

The valve illustrated in FIGURES 1 to 3 is of the gate type and employs a body of fabricated construction. Thus the body consists of plate-like front walls 10 formed of suitable material such as mill rolled steel or steel alloy of suitable thickness, and which are provided with aligned flow openings 11. These openings can be tapered as illustrated in FIGURE 2. Intermediate body means 12, in the form of a band bent to a configuration similar to that of the front walls 10, is interposed between these walls and serves to enclose the inner body space 13. As disclosed in my copending application Serial No. 5,430, filed of even date herewith, suitable sealing means 14, as for example of the resilient O-ring type, forms seals between the intermediate body means 12 and the front walls 10. A block 16 is also disposed between the front walls 10 and is attached as by welding to the ends of the body band 12. The block is provided with a central bore to accommodate the operating stem 17. A mounting plate 18 is shown attached to this block, and serves to carry certain parts of valve operating means. The sealing means 14 extends across the faces of the block 16. The operating means may include a gear box 19 for rotating the stem.

The front walls 10 have a configuration which includes the enlarged arcuate portions 20, which generally surround the openings 11. The margins 21 of the front walls are provided with drilled openings 22, to accommodate the body clamping bolts 23. Also these margins serve to mount the lugs 24, which abut the outer surfaces of the rectilineal portions 12a of the body band 12. These portions are reinforced against outward deflection in response to internal fluid pressure. The enlarged arcuate portions 20 are similarly provided with lugs 26, which abut the curved end portion 12b of the body band 12. Thus, when the body bolts are applied, the body band 12 (together with the block 16) is held against displacement in a direction longitudinally of the body.

The valve member 27 is of the flat gate type and may be provided with sealing means 28 for establishing fluid tight seals between its faces and the adjacent inner surfaces of the front walls. The gate is threaded to engage the inner threaded end of the operating stem 17, and is movable to full open position from the closed position shown in FIGURES 1 and 2.

The arcuate portions 20 of the front walls 10 are shown provided with ears or tabs 31, with the tabs of the two walls being interconnected by the screws or bolts 32. Also interposed between the portions 20, there is an arcuate band 33, the ends of which may be attached as by tack welding to the rectilinear portions 12a of the body band 12. Band 33 separately functions as a spacer for the arcuate wall portions 20 and to enclose the space surrounding the corresponding end of the body.

It is assumed in FIGURES 1 and 2 that the valve body is being coupled to pipes in conjunction with the flanged coupling hubs 34. These hubs may be of conventional construction and in accordance with usual practice they may be welded to the ends of the associated piping. It will be noted that the bolt circle 36 of each flanged hub has a diameter such that the flanged bolts 37 do not pass through the body. However, for a minor part of each bolt circle 36, flanges are bolted to the body by use of stud bolts 38 which are inserted into the front walls 10.

Assuming that the body is bolted together as described above, in conjunction with the pipe coupling hubs 34, it will be apparent that the bolts 37 serve not only to clamp the coupling hubs upon the body, but also to clamp the parts of the body together. Portions of the body which extend to one side of the hubs 34 are separately clamped together by means of the bolts 23. The complete valve assembly provided in this fashion is economical with respect to the amount of metal required and is flexible in that it can be readily applied to a wide variety of installations. The tapered openings 11 provide some degree of energy recovery for the fluid flow.

If desired, a separate throat section or recovery tube can be inserted into the piping adjacent the valve, in the manner shown in FIGURE 4. In this instance, the construction is substantially the same as in FIGURE 2, except that a light sheet metal shell 41 is inserted into the downstream piping. The small end 42 of this tube or shell has an opening corresponding to the body opening 43, and is held against lateral displacement by means such as the diaphragm 44. The outer edge of this diaphragm can be lightly welded to the hub 34, and the inner periphery welded to the tube end 42. One or more openings 42 can be provided for pressure equalization. If desired, two such recovery tubes can be provided, one for each side of the valve.

In FIGURES 6 and 7, the valves 46 are of a somewhat different configuration and the flow openings 47 in these walls are offset with respect to the axis of the hubs 34. The offset is sufficient whereby at the lower end of the valve, the openings 47 are substantially contiguous with the lower side of the passage through the hubs. The arcuate wall portions 48 correspond to the portions 20 of FIGURES 1 and 2, and are of a modified configuration. Otherwise the valve of FIGURES 6 and 7 is substantially the same as shown in FIGURES 1 and 2.

A valve constructed in accordance with FIGURES 6 and 7 can be provided with an insert recovery tube 49, as shown in FIGURE 8. In this instance, the small end 51 of the tube 49 is held in place by the plate 52. The shaping of the tube 49 is such as to accommodate the offset relationship between the body openings 53 and the passage of the piping 54. Here again similar tube sections can be provided for both the inflow and discharge sides of the valve.

It will be evident from the foregoing that I have provided a relatively simple valve construction which facilitates the use of valve openings substantially smaller in diameter than the diameter of the piping with which the valve is used. The effect of Venturi flow can be obtained without materially modifying the structure of the valve body, and without use of excess amounts of metal. In general the construction is economical to manufacture, and it can be readily installed and repaired under field conditions.

I claim:

1. In a valve construction, a valve body comprising plate-like front walls, intermediate body means interposed between said front walls, said intermediate body means having substantially parallel side portions and top and arcuate bottom end portions, said side and end portions defining an inner enclosed body space, said front walls having aligned circular flow openings adjacent one end of the body, a valve gate disposed within said body space and movable between open and closed positions relative to said openings, coupling means for attaching piping to the body, said coupling means having flow passages substantially greater in diameter than said flow openings in said front walls, said bottom portion of said intermediate body means surrounding and being positioned in close proximity to arcuate peripheral portions of said circular flow openings and on a radius substantially less than the radius of said flow passages, the distance between said side portions of said intermediate body means being slightly greater than the diameter of said flow openings and substantially less than the diameter of said flow passages, the width of said gate being approximately equal to the distance between said side wall portions and substantially less than the diameter of said flow passages.

2. A valve as in claim 1 together with a tapered recovery tube positioned at the downstream side of the flow openings in said front walls, the small end of said tube being in direct communication with the flow opening in the downstream side of said front walls.

3. A valve as in claim 1 in which the axis of said flow openings is offset with respect to the axis of said flanged pipe hubs.

4. A valve construction as in claim 1 including an arcuate spacer band disposed between the plate-like front walls with its circumferentially spaced ends disposed adjacent the side wall portions of said intermediate body means, said spacer band intermediate its said ends being outwardly spaced and separate from said intermediate body means.

References Cited in the file of this patent

UNITED STATES PATENTS

| 2,414,751 | Ludeman | Jan. 21, 1947 |
| 2,596,817 | McGovney | May 13, 1952 |
| 2,850,260 | Perazone | Sept. 2, 1958 |

FOREIGN PATENTS

| 7,334 | Great Britain | Apr. 2, 1908 |
| 1,002,580 | Germany | Feb. 14, 1957 |